July 28, 1931.  W. J. GRAYBILL  1,816,148
PAN GREASING MACHINE
Filed Sept. 6, 1929  6 Sheets-Sheet 5

W. J. Graybill, INVENTOR
BY Victor J. Evans, ATTORNEY

July 28, 1931.  W. J. GRAYBILL  1,816,148
PAN GREASING MACHINE
Filed Sept. 6, 1929  6 Sheets-Sheet 6

W. J. Graybill
INVENTOR
BY Victor J. Evans
ATTORNEY

Patented July 28, 1931

1,816,148

UNITED STATES PATENT OFFICE

WILLIAM J. GRAYBILL, OF YORK, PENNSYLVANIA, ASSIGNOR TO HARRISON B. WALTMAN, OF SPRINGETTSBURG, PENNSYLVANIA

PAN GREASING MACHINE

Application filed September 6, 1929. Serial No. 390,763.

This invention relates to a novel machine for greasing baking pans in bakeries, and one of the primary objects of the invention is to provide a machine by the use of which this operation may be greatly facilitated, thereby permitting a maximum number of pans to be greased in a minimum length of time.

Another important object of the invention is to provide a pan greasing machine which will in its operation, apply a thin and uniform film of grease to all parts of the inner surface of the pan thereby insuring of successful use of the pan in the baking of bread or cake without any portion of the pastry sticking to the walls of the pan.

Such means as have heretofore been employed for greasing baking pans in bakeries have presented the disadvantage that the grease is liable to be strewed over the machine, the workmen, and the floor on which the machine is mounted, and therefore the present invention has as a further object to provide means whereby throwing of grease from the brushes of the machine in a manner to result in this nuisance is entirely avoided, the invention contemplating a machine so constructed that it may be operated continuously and pans placed therein for greasing and removed therefrom when greased, without any interruption in the operation of the machine.

Another object of the invention is to provide in a pan greasing machine means whereby the machine may be adjusted to accommodate pans of different dimensions in a ready and convenient manner so that the pans will be equi-distantly spaced from one another throughout the entire operation and be simultaneously treated.

Another object of the invention is to provide in a pan greasing machine embodying grease applying brushes for applying grease to the inner surface of the pans, means for effecting automatic rotation of the brushes alternately in opposite directions for equal periods of time, in order that the application of oil to the inner surfaces of the pans will be effected in an even manner.

Another object of the invention is to provide a pan greasing machine which, while adapted to simultaneously act upon a considerable number of pans, may be controlled by a single workman without any interruption in the operation of the machine.

Another object of the invention is to provide a pan greasing machine which may be operated with the greatest economy in the use of grease or cooking oil, the grease which is delivered to the brushes and which is not applied to the pans, being returned automatically to the source of supply.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
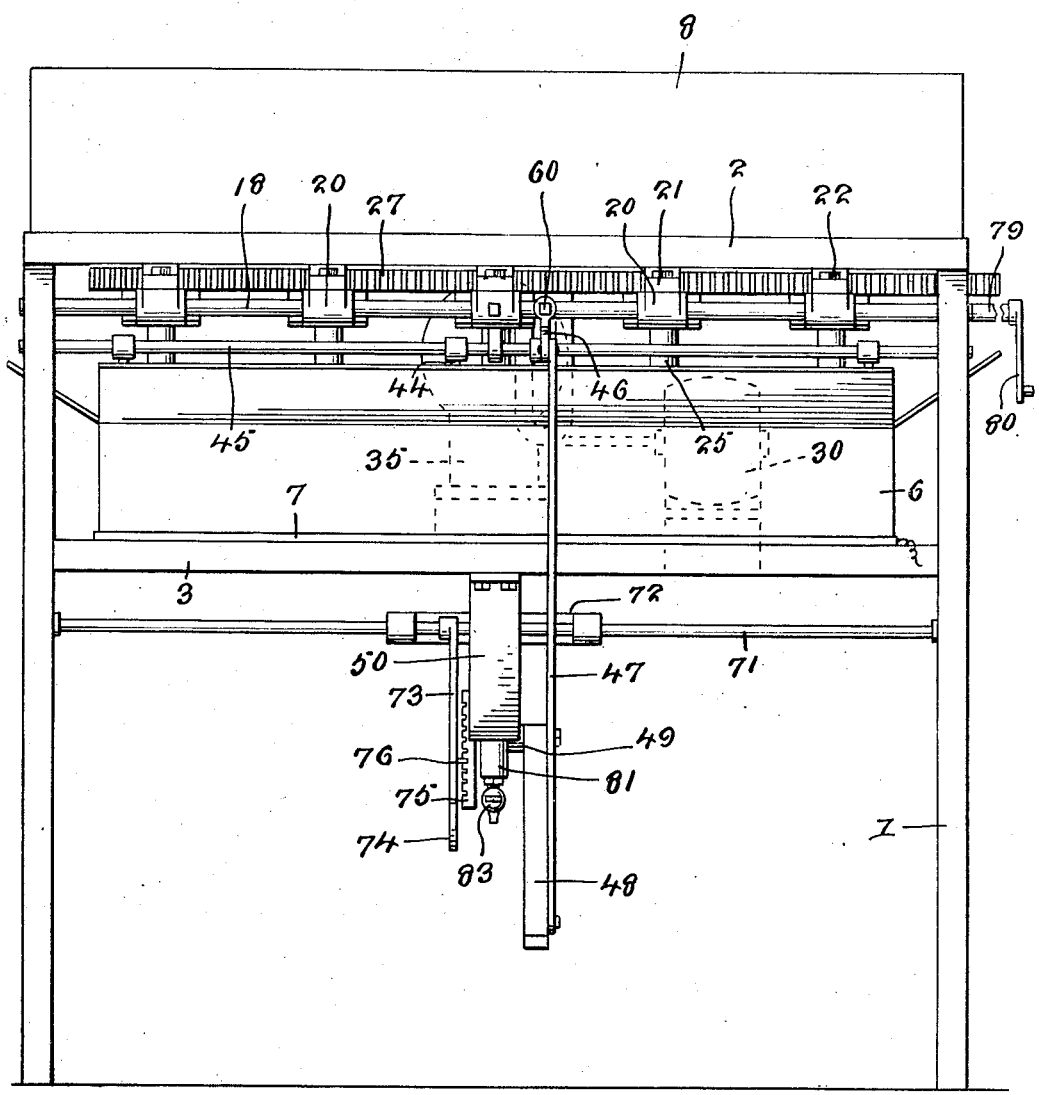
Figure 1 is a view in front elevation of the baking pan greasing machine embodying the invention.
Figure 2:
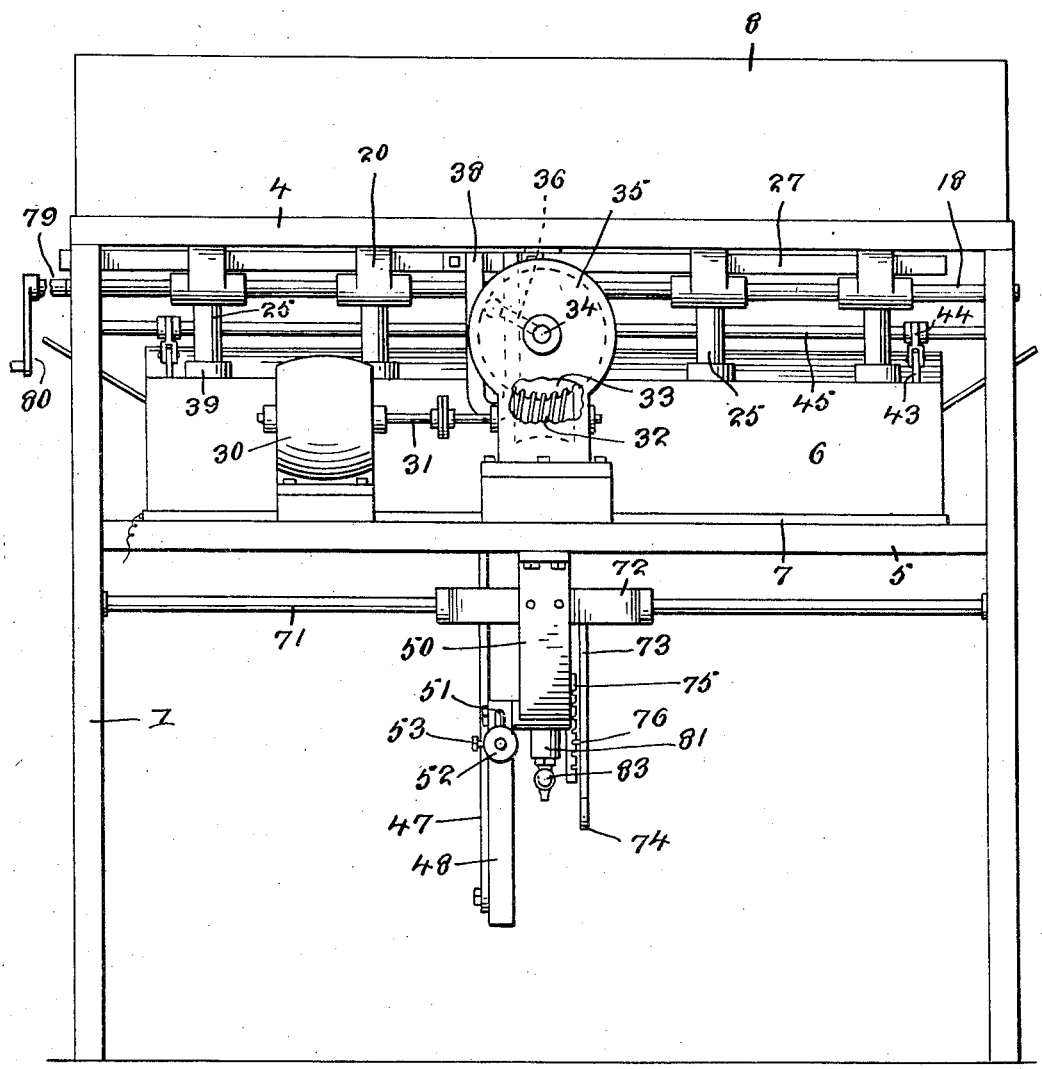
Figure 2 is a rear elevation of the machine.

In the drawings the machine includes a suitable frame structure which preferably comprises corner uprights 1, upper and lower front and rear rails indicated by the numerals 2 and 3 respectively, and upper and lower end rails indicated respectively by the numerals 4 and 5, it being understood however, that any suitable frame structure may be employed for the purposes of the invention. The oil reservoir of the machine is indicated by the numeral 6 and the same comprises a rectangular pan which is supported within the frame structure upon the lower rails 3 thereof, and which is preferably provided, beneath its bottom with an electrical resistance heating unit indicated by the numeral 7. Grease or cooking oil to be supplied to the brushes of the machine, which brushes will presently be more fully described, is introduced into this reservoir at suitable intervals so as to maintain an adequate supply, and it will be understood that due to the provision of the heating unit 7, the oil will be heated while the machine is in operation so that whether oil or grease be employed, the same will be in a liquid state and at a desirable degree of temperature when delivered to the brushes.

Figure 7:
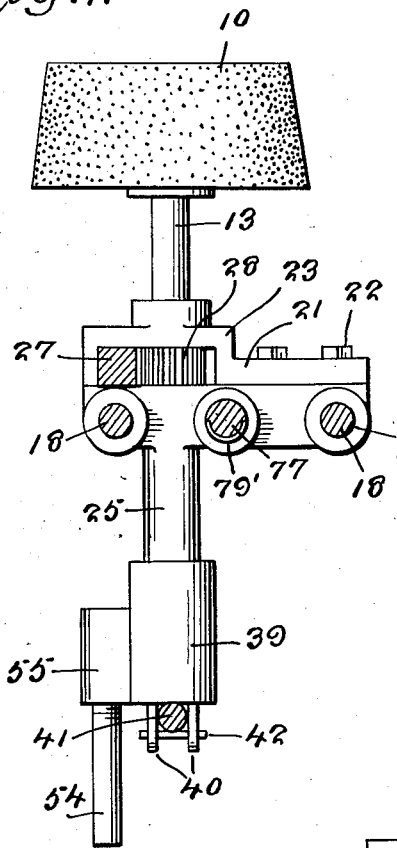
Figure 7 is a view in elevation, partly in section, showing the manner in which the brushes are supported and operated.

The chamber in which the pans are to be oiled is preferably of sheet metal and is indicated in general by the numeral 8, and is of rectangular form and mounted upon the front and rear, and end upper beams of the frame structure. This chamber is provided with a slot 9 which extends longitudinally medially thereof and is completely open at its top in order that the pans may be introduced thereinto and removed therefrom. This slot is provided, as will be presently explained, to accommodate elements of the means provided for rotating the brushes. The brushes are indicated in general by the numeral 10, and are illustrated in detail in Figures 7 and 8, and by reference to these figures it will be observed that each brush comprises a head 11 which may be of wood or any other suitable material into which are fitted the inner ends of tufts of bristles indicated by the numeral 12. The tufts of bristles are arranged in and about the circumference of the head 11, and also at the top of the head, each brush has its bristles so proportioned as to length and so arranged that each brush will be of frusto-conical form, the taper of each brush being substantially the same as the angle of inclination of the side and the end walls of the ordinary baking pan.

The head 10 of each brush is mounted upon the upper end of a tubular shaft 13, the body of the head 11 having a bore 14 of a diameter to snugly fit this end of the shaft, and being preferably formed in its lower end with a polygonal recess 15 to accommodate a flange 16 of similar marginal contour, upon the shaft 13, so that the head 11 is held for rotation with the respective shaft and may yet be readily removed therefrom by upward displacement. In order that oil may be supplied through the shafts 13, and to the bristles of the brushes, the upper end of the shaft 13 is formed with an opening 17 through which the melted grease or the oil may flow and it will be understood at this point that, in the rotation of the shaft 13, the grease or oil will flow over the top of the head 11 and down the sides thereof, and by centrifugal force, being caused to flow to the outer ends of the bristles of the various tufts so that when the pan to be greased is disposed in inverted position upon the brush, the bristles, will at their outer ends, contact the inner surface of the walls of the pan to apply a film of the grease or oil thereto, and, due to the fact that the brush is of the contour described above, it is evident that the inner surface of the walls of a pan disposed in inverted position over the brush, will be supplied with a uniform film-like coating of grease.

The means for supporting and rotating the shafts 13 for the brushes 10 will now be described. The numeral 18 indicates two rods which extend parallel to each other and longitudinally of the frame near the front thereof and beneath the bottom of the greasing chamber 8, and these rods extend through openings 19 formed in heads 20, which are secured in assembled relation to bearing members 21, which are mounted upon the upper sides of the heads and secured thereto by suitable bolts 22. Each of these bearing members includes a head portion 23 having a bore 24 formed therein to rotatably receive the tubular shaft 13, the head 20 being formed with a downwardly extending sleeve 25 having a bore 26 therein, which is in axial alignment with the tubular shaft 13. The numeral 27 indicates a rack bar which is mounted for longitudinally shifting in the portions 23 of the bearing members 21, a pinion 28 being fixed upon each of the tubular shafts 12, and these pinions being in mesh with the said rack bar. It will be observed by reference to Figure 8 that the tubular shaft 13 extends, below the respective pinion 28 and rests in an enlargement 29 of the upper end of the bore 26 of the sleeve extension 25. The means provided for imparting rotary motion to all of the brushes through the medium of their shafts 13 comprises an electric motor 30, the shaft of which is connected with the shaft 31 constituting a part of a gear train including a worm 32, which is formed or fixed upon the said shaft and a worm gear 33, which is in mesh at its lower side, with the said worm.

Figure 6:
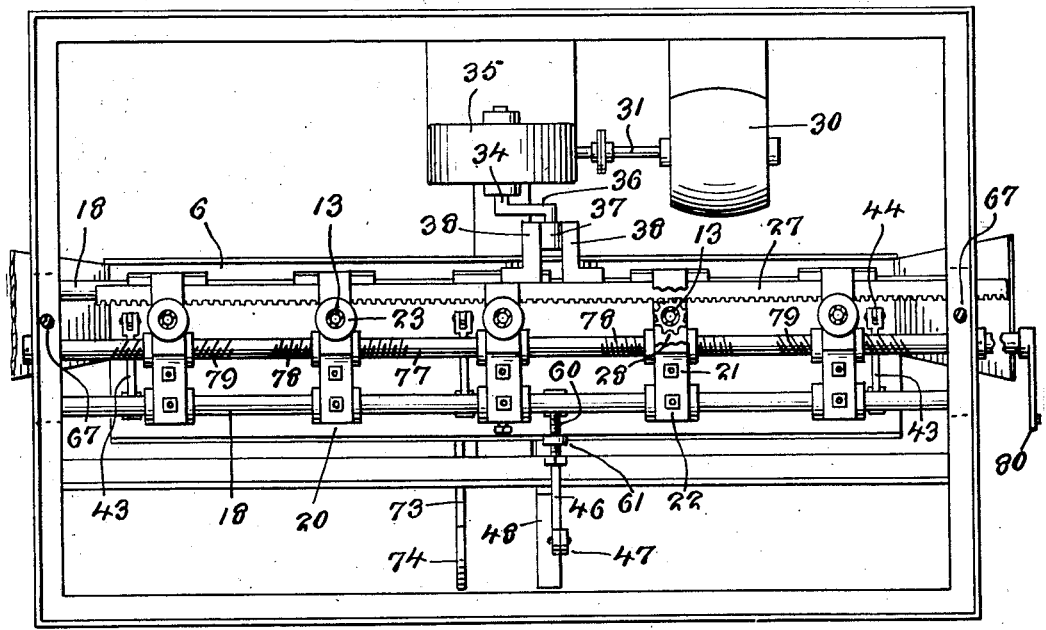
Figure 6 is a horizontal sectional view taken substantially on the line 6—6 of Figure 3, looking in the direction indicated by the arrows.

A worm gear 33 is mounted upon a shaft 34 and the said worm and gear are housed within a casing 35 mounted in the framework, and as best shown in Figure 6 of the drawings, a crank arm 36 is provided at the forward end of the shaft 34 and a roller 37 is rotatably mounted upon the end of the crank arm and travels between spaced guides 38, which are mounted upon the rear side of the rack bar 27, it being understood that through the medium of this connection the rack bar is continuously reciprocated in the bearing members 21 and in mesh with the pinions 28, and therefore rotary motion, is as previously stated, imparted through the pinions 28 to the brush shafts 13.

Figure 8:
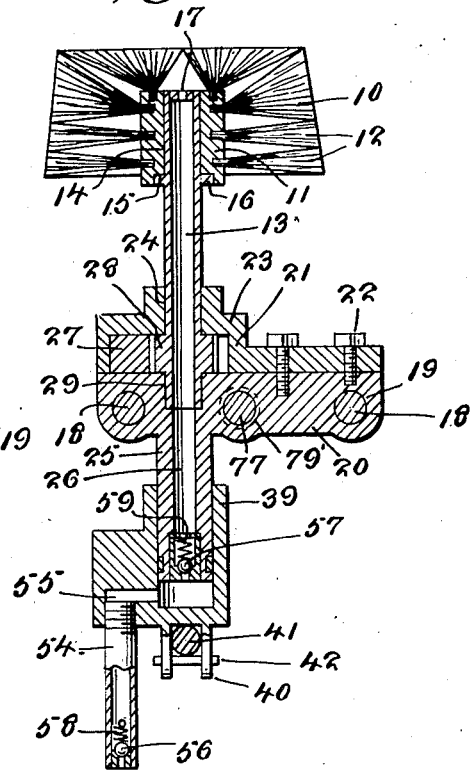
Figure 8 is a vertical sectional view through the brush supporting and rotating means shown in Figure 7, and illustrating the means provided for supplying grease or cooking oil to the brushes.
Figure 9:
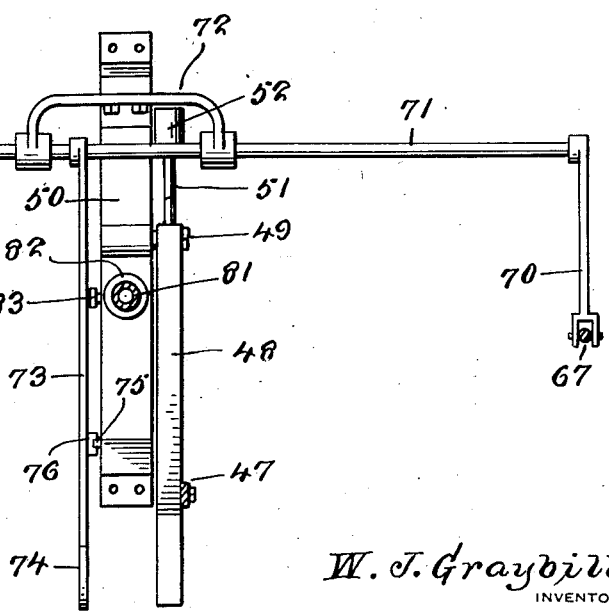
Figure 9 is a view illustrating, in plan, the means provided for effecting upward and downward adjustment of the oil reservoir for each individual brush.

The sleeve extensions 25 of the heads 20 are of a diameter to constitute plungers which work in small cylinders 39, which are equal in number, of course, to the number of brushes, and each cylinder is formed upon its bottom with a pair of spaced ears 40, which ears straddle a rod 41 upon which the under sides of the bottoms of the cylinders rest as clearly shown in Figure 8 of the drawings. A pin 42 is fitted through each pair of ears 40 and extends below the rod 41, so that the rod and cylinders are in this manner connected for up and down movement in unison. In order that the rod 41 may be moved bodily upwardly and downwardly to elevate and lower the cylinders 39, the rod is supported at its ends in openings in the lower ends of bars 43 which are pivotally connected at their upper ends to the rear ends of arms 44 which are secured at their forward ends to a shaft 45, and to this shaft intermediate its ends, there is secured a rock lever 46 connected at its forward end to the upper end of a link bar 47, this bar being pivotally connected at its lower end to a foot lever indicated by the numeral 48, the lever being pivoted, near its rear end as at 49 to a bracket 50 which is mounted in the frame work and provided at its forward end with a foot pedal by means of which it may be swung downward at its forward portion to exert a pull upon the link bar 47 to rock the lever 46 and elevate the rod 41 and the cylinders supported thereon. It will be understood of course that when the foot pedal is relieved of pressure, the total weight of the cylinders 49 together with the rod 41 will return the lever to its elevated position, the lever 48 being likewise provided with a rearwardly extending arm 51, upon which a counterweight 52 is slidably adjustably fitted and held in place by a set screw 53, this counterweight being therefore so arranged as to tend to move the lever to its elevated position.

In order that, upon each depression of the foot lever 48, grease will be caused to enter the cylinders 39, an intake pipe 54 is threaded at its upper end in the enlarged end of a port 55, which connects with the bore of the respective cylinder 39 near the lower end thereof, and this intake pipe extends downwardly into the reservoir 6 and a check valve 56 is mounted in the lower end of the pipe. The lower end of the bore 26 of the stem 25 is increased in diameter and there is mounted in this end of the bore a check valve indicated by the numeral 57, the valves 56 and 57 being respectively held in lowered or closed positions upon their seats by small springs indicated by the numerals 58 and 59. It will now be evident that when the cylinders 39 move downwardly to a lowered position within the reservoir 6, the oil or grease within the reservoir will enter the intake pipe 54 past the check valves 56 and be trapped in the lower portion of the cylinder 39. When it is required to replenish the supply of oil to the brushes 10, at intervals during their rotary motion, downward pressure upon the pedal of the foot lever 48 will effect the upward movement of the cylinders 39 and, as the check valves 56 are then closed, and the valve 57 opened, a pressure is exerted to force the oil or grease upwardly through the bores 26 of the stems 25 and through the openings 17, to the brush heads, it being assumed that the lever 48 has previously been depressed a sufficient number of times to fill the bore 26 of the stem 25, and the hollow shaft 13 of each brush unit with the oil or grease. Upon release of pressure upon this pedal, the lever 48 will then be swung upwardly at its forward portion to effect rocking of the lever 46 and a downward movement of each of the cylinders 39 with the result that the check valve 57 will remain closed and the suction then created in each cylinder 39 will effect opening of the respective check valve 56 with the result that a further supply of oil or grease will be drawn into the cylinder 39 and the pipe 54. In order that the return movement of the foot lever may be resisted as likewise the downward movement of the cylinders 39, an abutment screw 60 is adjustably mounted in an upstanding lug 61 upon the lever 46 and is adapted to abut at its end opposite its headed end against the forward end of the head 20 or other fixed part which is associated with the relatively adjacent one of the brushes.

It is the practice, in bakeries, to connect together in a longitudinal series, a plurality of baking pans so that a number of the pans may be handled simultaneously and therefore the pans which are indicated by the numeral 62 in the drawings, are arranged in a series, equally distantly spaced with respect to each other and connected to one another throughout the series by means of connecting bars 63, riveted or otherwise secured as at 64, and each to a respective side of the series of pans. The invention contemplates the disposition of the group of pans to be greased, upon means which may be adjustable as to its elevation within the greasing chamber 8, so that, while the brushes are stationary in the sense that they are not vertically movable, pans of different depths may be acted upon by the use of brushes of the same size. This means comprises a frame which is indicated in general by the numeral 65 and which is of rectangular form and provided at its ends with sockets 66 into which are fitted the upper ends of rods 67 by which adjusting motion may be imparted to the frame 65 through the operation of a means to be presently described. The frame 65 further comprises a plurality of cross bars 68 which extend between the side members of the frame at suitable intervals so that, regardless of the relative spacing of the pans, the entire series will be substantially supported when arranged in inverted position upon the supporting frame.

Figure 3:
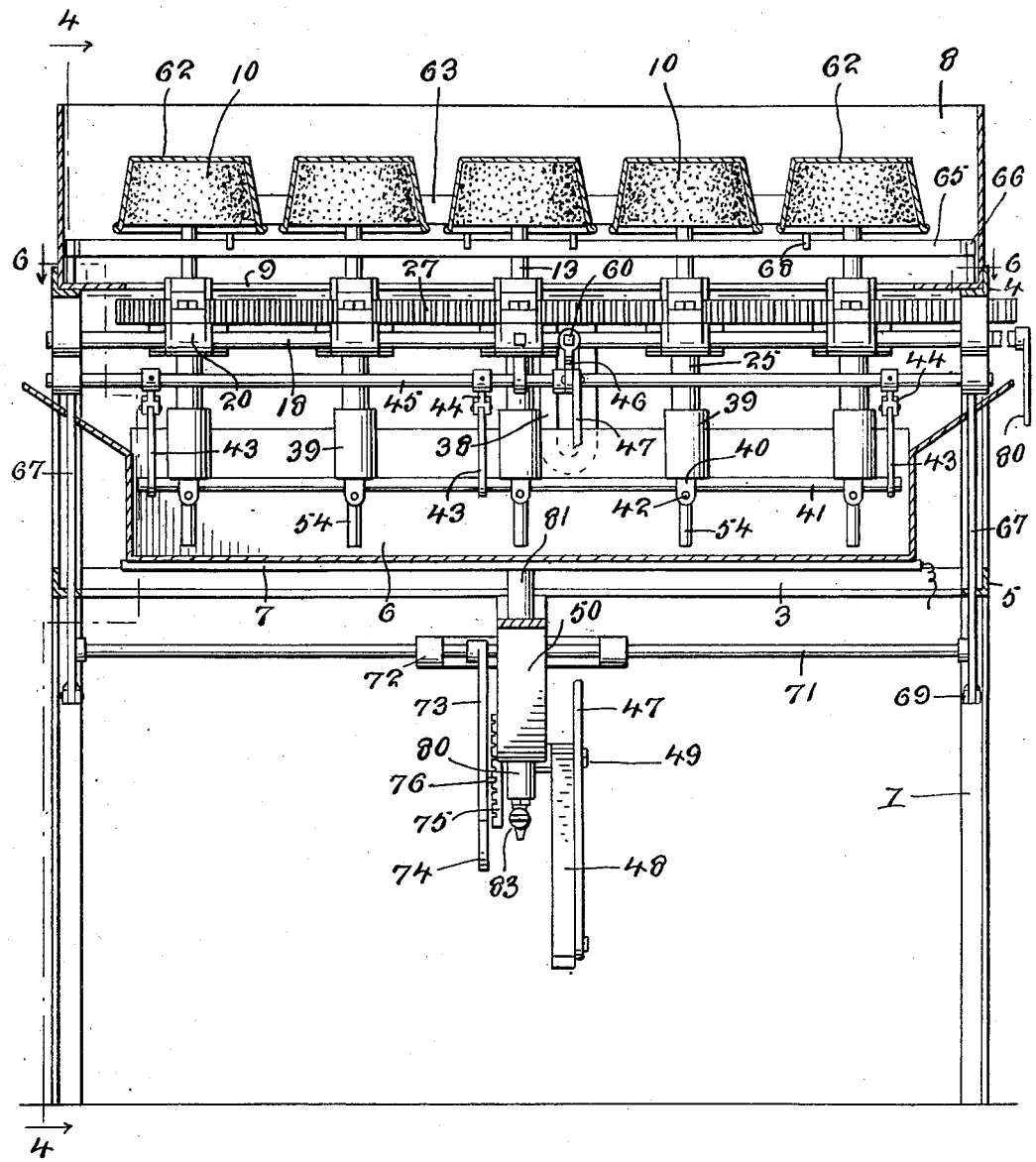
Figure 3 is a vertical longitudinal sectional view through the machine, on the line 3—3 of Figure 4, looking in the direction indicated by the arrows, it being understood that the pans are shifted to the other limit of their movement in the said Figure 3 as compared with Figure 4.
Figure 4:
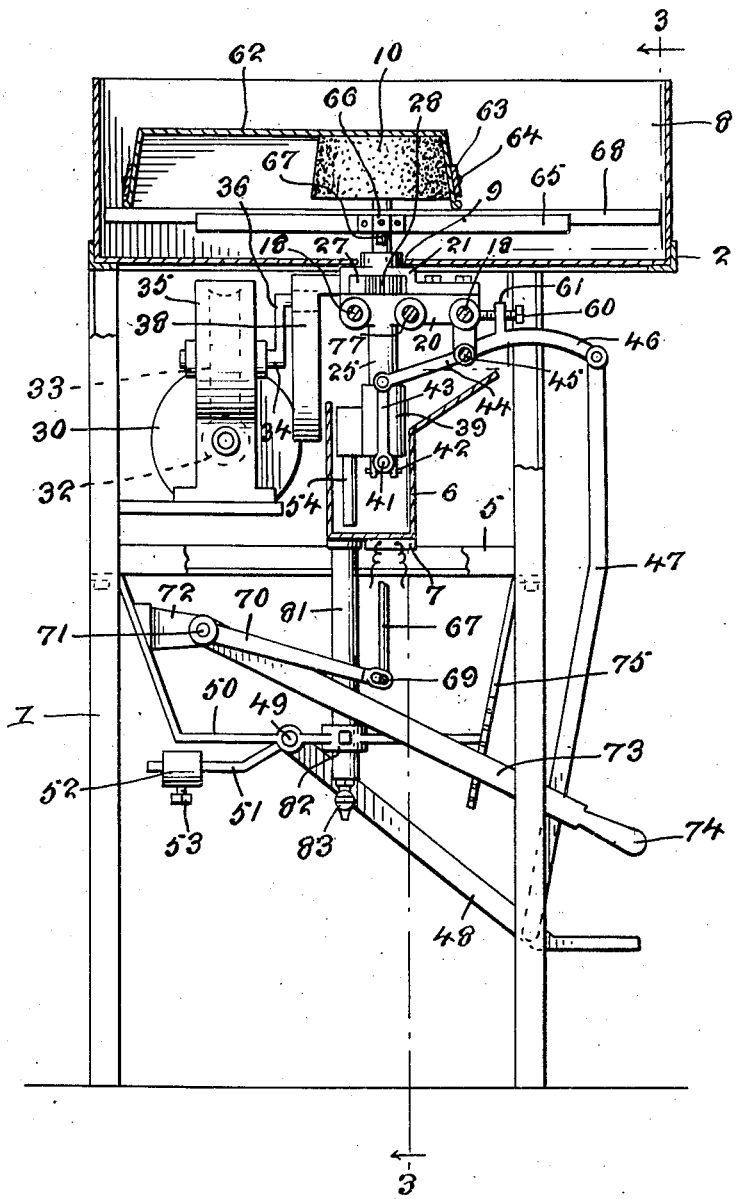
Figure 4 is a vertical front to rear sectional view taken substantially on the line 4—4 of Figure 3, looking in the direction indicated by the arrows.

The frame 65 is of dimensions to fit within the chamber 8 to extend between the end walls thereof and partly spaced from the front and rear walls, and the cross members 68 are arranged to extend at their ends beyond front and rear members of said frame with their said ends terminating relatively close to the front and rear walls of the said member. At this point it will be evident and particularly by reference to Figures 3 and 4 of the drawings, that the pans, in their assembled relation, may be shifted over the cross members of the frame, which cross members 68, as illustrated in Figure 3, project at their upper edges slightly above the other members of the frame, this shifting movement being in a line at right angles to and between the front and rear walls of the chamber 8. At their lower end, the rods 67 are pivotally connected as at 69, to the forward ends of arms 70, which are fixed at their rear ends to the shaft 71 extending above and in the rear of the shaft 49, previously referred to, and mounted in a suitable bracket 72 in turn mounted upon the bracket 50, and a hand lever 73 is also fixed to the shaft 71, and at its forward end is provided with a handle 74 by which it may be conveniently adjusted. A lug 75 is mounted upon or formed integrally with the bracket 50, previously referred to, and the laterally projecting pawl lug 76 is carried by the lever and is engageable with the teeth of the lug. The rods 67 extend upwardly thru openings in the bottom of the chamber 8, and these rods are connected with the frame 65 at the longitudinally middle of the frame, or in other words, midway between the front and rear sides thereof, and the frame is therefore equally balanced.

It will now be evident that the frame 65 may be adjusted, through the medium of the lever 73, to assume any desired position respective to the brushes 10 and therefore by noting the depths of the pans to be greased, the operator of the machine may readily adjust the frame 65 so that when the pans, in their assembled and connected relation are inverted and disposed above the respective ends of the brushes, the bristles at the upper ends of the brushes will engage against the surface of the bottoms of the pans and their circumferential surface will engage the side and end walls of each respective pan. It will also be evident that, while the machine is in operation and the grease or oil is being supplied to the brushes, the pans may be shifted in unison back and forth over the frame structure 65, thus insuring of a thorough coating of the interior surface of the walls and bottoms of the pans.

As previously stated, the machine is adapted for the greasing of pans of different dimensions, and it will usually be customary to group pans in a series of 3, 5, 7 or more pans to each series, and likewise as previously stated, the pans are equi-distantly spaced throughout the series. In order to provide for maintenance of the pans in equi-distantly spaced relation and accommodate the series of groups of pans, different in number, a means is provided whereby the brushes may be properly relatively adjusted in a short period of time and without disconnecting any of the members of the machine.

Figure 5:
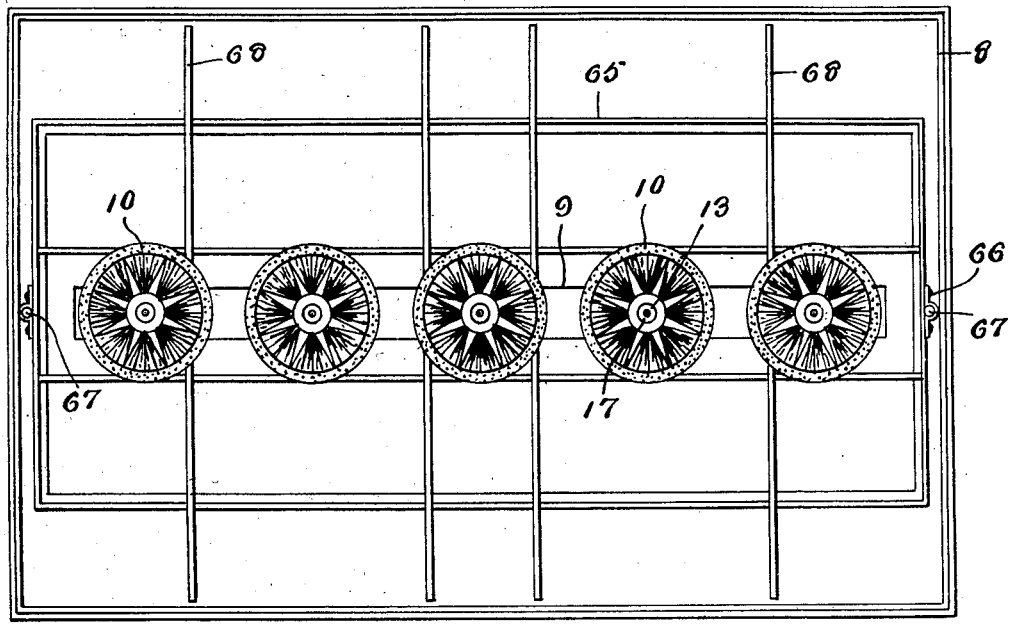
Figure 5 is a top plan view of the machine.

With this end in view the invention contemplates the employment of an adjusting screw shaft 77 and, assuming that there are five of the brushes to be rotated and relatively adjusted, the shaft will be formed at a point intermediate its ends, devoid of threads and at the opposite sides of its intermediate portions with right and left handed threads 78, other threads 79 being formed in the shaft between the threads 78 and the adjacent ends of the shaft and corresponding, in pitch, to the said threads 78. The bearing heads 20 of all the brushes, with the exception of the middle or intermediate brush of the series, where five brushes are employed, will be provided each with a threaded opening 79', the openings in the bearings heads, which are to fit the threaded portions 78 of the shaft 77, having their threads of the same pitch as the threads 78, and likewise the threads in the bearing heads of the brushes which are to fit the openings 79' having the same pitch as these threads. The threads 78 are of less pitch than the threads 79, and therefore assuming that the openings in the heads 20 of the end brush bearing heads or more specifically the portions of the bearings in which they are formed, are midway the end of the threaded portion 79 of the shaft 77 and the portion of the bearing heads the next adjacent brushes are midway the ends of the threaded portion 78 of the shaft, and the bearing head for the middle or intermediate brush, is midway between the adjacent ends of the threaded portions 78, or in other words midway the unthreaded intermediate portion of the shaft, all of the brushes will be equally distantly spaced, and the spacing between the brushes will permit of the disposal upon the assemblage thereof, of an assemblage of pans which will be equally distantly spaced and so spaced as to all fit over the respective brushes in the same manner so that the pressure of the bristles of the brushes will be uniform on the respective pans throughout the entire series. Assuming that the bearings are adjusted to the positions shown in Figures 3, 5 and 6 of the drawings, as above described, and it is desired to grease pans of a greater width than those shown in Figure 3, the brushes may be accurately relatively adjusted by the rotation of the shaft 77 through the medium of a crank handle 80 fixed upon one end thereof, the brush bearings which are adjusted through the medium of the threads 79 being moved twice the distance the brush bearings which coact with the threads 78 are moved and the intermediate brush bearing remaining substantially stationary. This is of course due to the difference in pitch of the threads 78 and 79, the pitch of the threads 79 being twice that of the threads 78. Of course the reverse rotary adjustment of the shaft 77 is effected where pans narrower than those shown in Figure 3 are to be greased.

As previously stated the bearings for the brushes extend upwardly through the slot 9 in the bottom of the chamber 8 and it will be evident that the heated grease or oil delivered into the reservoir 6, and supplied to the brushes 10 and the quantity of oil thus supplied, there will be a portion which will not remain upon the surfaces of the pans and this will therefore flow over the walls of the pans into the said greasing chamber 8, and this unused part of the whole volume of oil will drain through the slot 9 and back into the reservoir 6 from which it may again be drained for use.

In order that the reservoir 6 may be drained, in the event that after continuous use for a period of time, the greasing medium becomes foul, a drain pipe 81 is connected at its upper end to the bottom of the reservoir and the pipe extends downwardly through a suitable guide 82 upon the horizontal portion of the bracket 50 and a drain valve 83 is arranged in the lower end of said pipe.

In as much as the supply of the greasing medium to the reservoir, for the brushes and in turn from the reservoir to the brushes, and the adjustment of the hand lever 73 is not required to be made when pans of different dimensions are to be greased, it will be quite evident that the apparatus may be controlled by one workman, whose chief task will be to reciprocate the pans in the greasing chamber and from time to time, actuate the foot lever, it will be evident that the workman is not subjected to the inconvenience of having the greasing medium thrown on the clothing in removing greased pans and placing other pans in position for greasing due to the peculiar structure of the greasing chamber.

What I claim is:—

1. In a baking pan greasing apparatus, a greasing chamber, a brush rotatably mounted therein, means for supplying a greasing medium to the brush, means for rotating the brush, means within the chamber for supporting a pan, to be greased, in inverted position over the brush, and means operably to adjust the supporting means vertically with respect to the brush in accordance with the depth of the pan to be greased.

2. In a baking pan greasing apparatus for simultaneously greasing a connected series of baking pans, a greasing chamber, brushes rotatably mounted therein, and equal in number and corresponding in spacing to the pans to be greased, means for supplying a greasing medium to the brushes, a frame supported for vertical adjustment within the chamber and constituting means for supporting the group of pans being greased in inverted position over the respective brushes, and means for vertically adjusting said frame with respect to the brushes thereby to adapt the apparatus to grease groups of pans of different depth.

3. In a baking pan greasing apparatus, a greasing chamber, a brush rotatably mounted therein, and comprising a head provided with bristles, and a tubular shaft having an outlet in its upper end for the delivery of the greasing medium to the bristles, means for rotating the shaft, a reservoir for the greasing medium, a bearing for the shaft having a tubular extension, a cylinder slidably fitting said extension and in communication with the shaft by way of the bore of the bearing extension, the extension constituting a piston in the movement of the cylinder, a check valve in said tubular extension, opening in the direction of the tubular shaft, an intake pipe extending from said cylinder and downwardly into the reservoir, a check valve in the cylinder, and means operable to impart reciprocatory motion to the cylinder to effect supply of the greasing medium to the shaft of the brush on one stroke of the cylinder and to effect supply of oil to the cylinder from the reservoir on the other stroke of the cylinder.

4. In a baking pan greasing apparatus, a greasing chamber, a brush rotatably mounted therein, a tubular shaft supporting the brush, means for rotating the shaft, a reservoir for the greasing medium, a bearing for the shaft having a portion constituting a piston having a bore in communication with the bore of the shaft, a cylinder supported to reciprocate upon said portion, a check valve in the said piston bore opening in the direction of the delivery end of the bore of the brush shaft, an intake pipe in communication with the lower portion of the cylinder beneath the lower end of the piston, a check valve in said intake pipe opening in the direction of the upper end of said pipe through which end the greasing medium is to be delivered into the cylinder, means operable to reciprocate the cylinder, the said means comprising a foot lever, and operative connection between the foot lever and the cylinder.

5. In a baking pan greasing apparatus of the type capable of greasing baking pans connected to one another in a series and in equally spaced relation to one another, a greasing chamber, a plurality of bearings mounted on said shaft and adjustable longitudinally thereto, a shaft journalled in each of said bearings and extending upwardly into the greasing chambers, a brush upon each of the last mentioned shafts within said chambers, means for simultaneously rotating the last mentioned shafts, and means operable to simultaneously and relatively adjust the bearings for the brush shafts along the last mentioned shaft to equally vary the spaces between the brush shafts and thus synchronously adjust the brushes carried by said shaft.

6. In a baking pan greasing apparatus of the type capable of greasing baking pans connected to one another in a series and in equally spaced relation to one another, a greasing chamber, a shaft mounted for rotation below said chamber, a plurality of bearings mounted on said shaft, a shaft journaled in each of said bearings and extending upwardly into the greasing chamber, and a brush upon each of the last mentioned shafts, within said chamber, and means for simultaneously rotating the last mentioned shafts, the bearings for the brush shafts having interiorly threaded bores, the first mentioned shaft having screw threads along its portions upon which the bearings are mounted, the bearings being threaded to fit said portions of said shaft, the threads of the shaft adjacent the ends of said shaft having a like pitch and the threads adjacent the first mentioned threads having a less pitch and the threads of the respective bearings being of a pitch to correspond to the pitch of the threads of the portions of the shaft upon which they are mounted, and means operable to rotatably adjust the threaded shaft to effect synchronous relative adjustment of the brush shafts to equally vary the spaces therebetween.

In testimony whereof I affix my signature.

WILLIAM J. GRAYBILL.